United States Patent Office 3,764,267
Patented Oct. 9, 1973

3,764,267
INSTRUMENT FOR MEASUREMENT OF HEMO-
GLOBIN CONTENT OF WHOLE BLOOD
Andrew F. Farr, South Gate, Calif., assignor to Farr
Devices Inc., South Gate, Calif.
Original application Sept. 18, 1968, Ser. No. 760,431, now
Patent No. 3,649,204. Divided and this application
Sept. 14, 1971, Ser. No. 180,460
Int. Cl. G01n 33/16, 21/20
U.S. Cl. 23—253 R
5 Claims

ABSTRACT OF THE DISCLOSURE

A compact instrument for measuring the hemoglobin content of whole blood, particularly arranged for the rapid analysis of a minute sample of a patient's blood supplied, immediately after collection, by a doctor in his own office. The instrument is so arranged that it may be fully automated, to make the hemoglobin determination after a blood sample has been delivered to it, and to provide an analysis for the doctor's use within a few minutes. The instrument utilizes a pump which deliveries to and mixes with the blood sample in a photometer examination cell, an accurately and continuously measured amount of an aqueous reagent, until the volume of reagent added causes the sample to match photometrically a standard sample. The hemoglobin content is directly shown in appropriate units on a meter or readout device at the completion of a cycle. In the fully automated form of the device, a complete analysis cycle leaves the instrument cleaned out and ready to make another analysis upon reception of another blood sample.

---

This is a division of application Ser. No. 760,431, filed Sept. 18, 1968, now U.S. Pat. No. 3,649,204.

BACKGROUND OF THE INVENTION

Hemoglobin analysis as presently practised by a physician in his office usually involves: drawing several milliliters of blood from the patient by vena puncture; transferring sample to a suitable container; labeling container and sending it to a clinical laboratory where at some later time a technician analyzes the sample by manual methods and returns a report to the doctor, several hours, or perhaps several days, later. Such a procedure has numerous inherently undesirable features: the inconvenience and possible dangers of vena puncture; the possibilities for sample contamination and/or ageing; the possibilities for labeling, analytical, and calculational errors; and most significantly, the unavailability of the analytical results at the time when the patient is initially in the office.

The present invention avoids such problems because; the minute blood sample volume required may be obtained by superficial finger tip or ear lobe punctures, a common practice; the sample is collected and measured in a calibrated short length of capillary tubing and inserted in the instrument without further manipulation; analytical results, automatically obtained and displayed in appropriate units, are available to the doctor within a few minutes. Moreover, the instrument requires no special skills for operation, and upon completion of one analysis cycle, is ready for the next sample.

SUMMARY

The principal object of this invention is to provide a partly or completely automatic instrument for measuring the hemoglobin content of fresh blood, wherein a sample of the blood in a short length of capillary tubing is inserted into the instrument, a hand-operated switch means starts the operation of the instrument, and in a short interval of time, a meter or readout device shows directly the hemoglobin content of the sample.

Another object is to provide a metering pump for use in this instrument and elsewhere, which, when activated, automatically draws in and then delivers a precisely and continuously measured quantity of a reagent liquid, and which will repeat this cycle of filling and discharging in response to suitable controls.

A further object is to provide means in this automatic instrument for receiving a measured sample in a calibrated capillary sample tube and for mixing the blood sample with a continuous uniform stream of reagent liquid from the pump through one pump discharge cycle, combined with a continuous light sensing comparison means for the resulting continuously changing mixture of blood sample and aqueous reagent, in relation to a selected optical sensing standard.

A further object is to provide automated means for quantitatively rejecting the used sample and capillary tube after an analysis cycle so that the instrument is ready for a subsequent sample.

BRIEF DESCRIPTION OF THE DRAWINGS

Reference is made to the drawings showing a preferred form of the invention, in which.

DESCRIPTION OF PREFERRED EMBODIMENTS

The principle involved in this instrument is the continuous comparison of the color or the light absorption of an unknown blood sample, with an optical absorption standard, during the progressive dilution of the sample with an aqueous reagent; when the diluted sample matches the standard, the volume of diluting reagent which has been consumed is registered and converted to terms of hemoglobin content of the unknown blood sample.

The aqueous reagent which is used for diluting the blood sample is preferably a 0.007 normal water solution of ammonium hydroxide having a pH of 10. A 0.04 percent by weight water solution of the tetrasodium salt of ethylenediaminetetraacetic acid (E.D.T.A.) may also be used.

Figure 1:
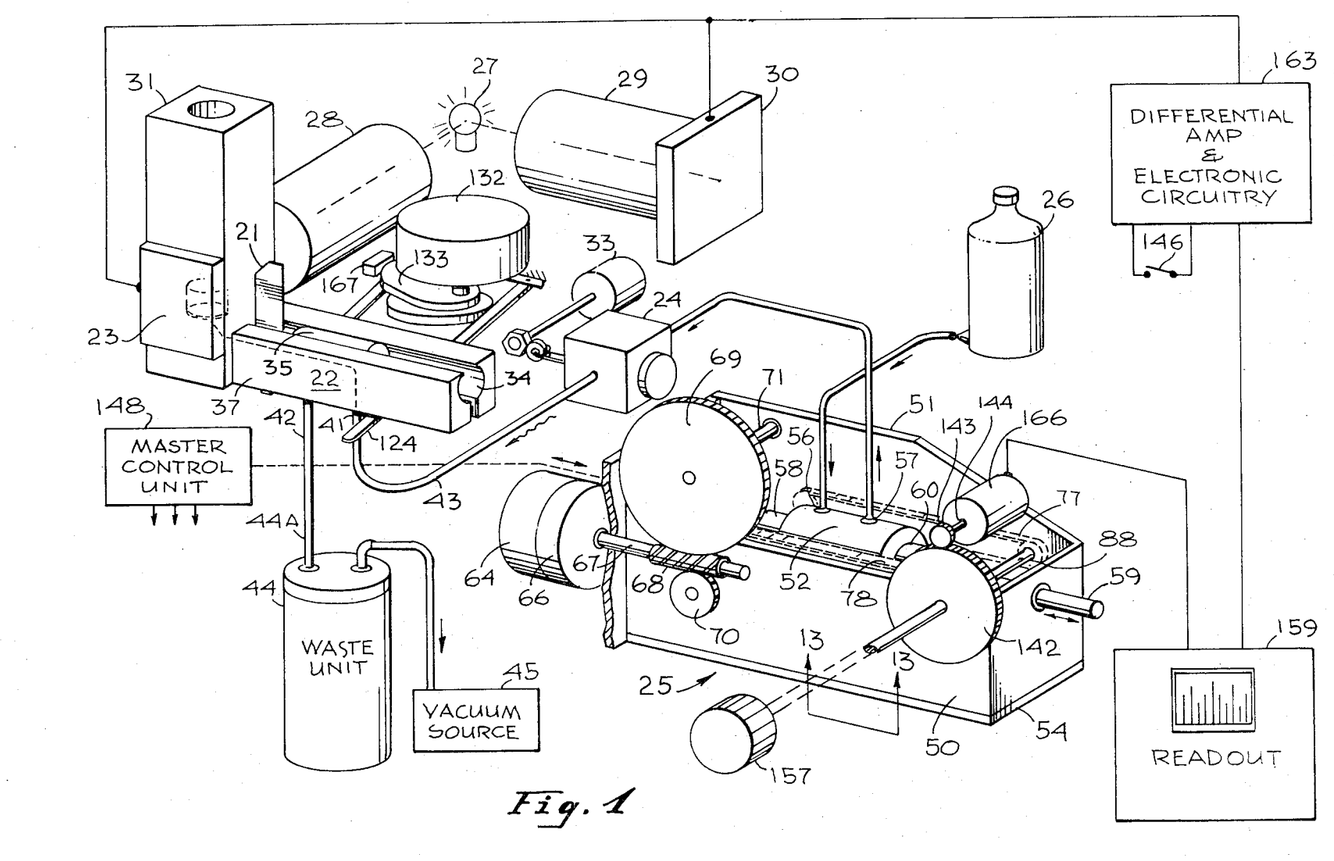
FIG. 1 is a diagrammatic perspective representation of the essential elements of the automatic blood hemoglobin analysis instrument assembly.

A diagrammatical assembly of the essential elements of the instrument is shown in FIG. 1. The unknown sample of blood (in a calibrated length of capillary tubing 20 with a handling tab 21, see FIG. 2), is delivered by hand to the instrument at the sample acceptor assembly 22, where, upon starting a test cycle, the capillary tube is put into communication at one end with the sample chamber or cuvette 31 of the photometric comparison assembly and at the other with the outlet tube from a pulsator 24, which is continuous with and receives diluting liquid from the outlet tube 43 of the metering pump unit 25. The metering pump unit 25 receives diluting liquid from a reagent reservoir 26. The diluted blood sample in the cuvette 31 of the photometric comparison assembly is subjected to a beam of light from the light source 27, which beam passes through the diluted sample and is received by a sample light sensor 23. The same light source 27 sends an equivalent light beam to a light absorbing standard 29 and thence to a standard light sensor 30.

The two light sensors 23 and 30 may be of any type in which the intensity of the light which reaches it produces a measurable electrical effect. Photosensitive resistors of the cadmium sulfide type are preferred, as certain of these are selectively sensitive in the light wavelength associated with hemoglobin, i.e. about 540 millimicrons.

THE METERING PUMP AND ITS DRIVE

Figures 7, 8, 8A, 8B, 8C, 9, 10:
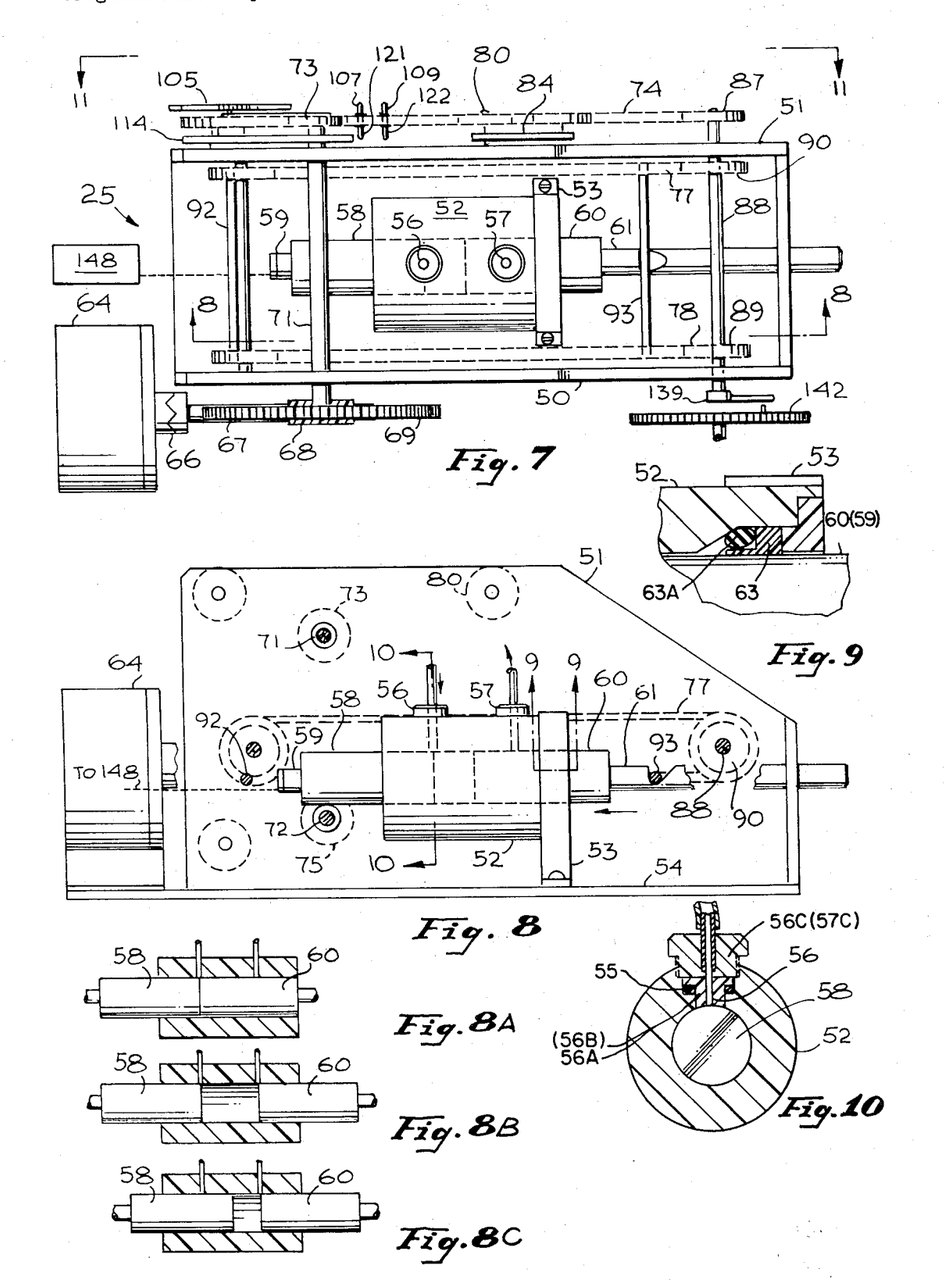
FIG. 7 is a plan view of the pump and drive means.
FIG. 8 is a side elevational view of the pump taken from the position 8—8 of FIG. 7.
FIG. 8A is a fragmentary cross-sectional view of the pump cylinder with the piston ready for the intake stroke.
FIG. 8B is a fragmentary cross-sectional view of the pump cylinder with the right hand piston retracted and cylinder filled.
FIG. 8C is a fragmentary cross-sectional view of the pump cylinder with the left hand piston driving reagent out through the outlet port.
FIG. 9 is a partial cross-sectional view taken on the line 9—9 of FIG. 8.
FIG. 10 is a cross-sectional view taken on the line 10—10 of FIG. 8.

The preferred metering pump unit 25 in general includes a pump cylinder, valves, pistons, and inlet and outlet conduits, as well as the supporting base and framework for mounting the drive mechanism. The pump cylinder 52 is mounted on a bracket 53 which is fastened to a base plate 54. The frame work for the driving mechanism consists of two vertical plates 50 and 51 disposed in spaced apart parallel relation to the center line of the cylinder 52 on opposite sides thereof.

The cylinder 52 is provided with two sliding pistons, 58, adjacent the inlet port 56, and 60, adjacent the outlet port 57. Piston rods 59 for piston 58 and 61 for piston 60, extend from the ends of the pistons, the rods being at times actuated by horizontally moving driving bars as will be described. The inlet port 56 and the outlet port 57 extend radially through the wall of the cylinder 52, and these ports are opened and closed with the movement of the pistons 58 and 60.

The driving mechanism for the pump consists in general of a motor, a worm drive, a main chain drive including a reversing mechanism which actuates the pistons slowly on the fill-discharge stroke and rapidly on the return stroke, and a pair of chain loops 77 and 78 which on a horizontal run, actuate the pistons by means of driving bars 92 and 93.

The motor 64 is mounted on the base plate 54 adjacent the vertical frame plate 50, switching means 148 being provided as described later. A coupling 66 connects the motor shaft 67 to a worm gear 68 which drives a large worm wheel 69 and a small worm wheel 70. The large worm wheel 69 is attached to a through shaft 71, mounted in bearings in the parallel vertical frame plates 50 and 51, there also being a slow drive sprocket 73 attached to the shaft 71 for actuation at times of the main drive chain 74. The small worm wheel 70 is mounted on a through shaft 72, which rotates in bearings in the frame plates 50 and 51, with a fast drive sprocket 75 for actuation, at times, of the main drive chain 74.

Idler sprockets 80 and 83 are pivoted on the frame member 51 in the runs of the main drive chain 74 before and following the piston drive sprocket 87. The chain 74 is kept in tension by opposed idler sprockets 81 and 82, which are pivoted on the free ends of pivoted arms 84 and 85, there being a tensioning spring 86 connected at its ends to said arms.

The main drive chain 74 drives sprocket 87 attached to through shaft 88 on which, between the vertical frame plates 50 and 51, are attached loop chain drive sprockets 89 and 90, which actuate the piston driving loop chains 77 and 78. Driving bars 92 and 93 engage the outer ends of the piston rods 59 and 61 respectively to, at times, move the pistons in response to the movement of the loop chains 78 and 77.

Figure 11:
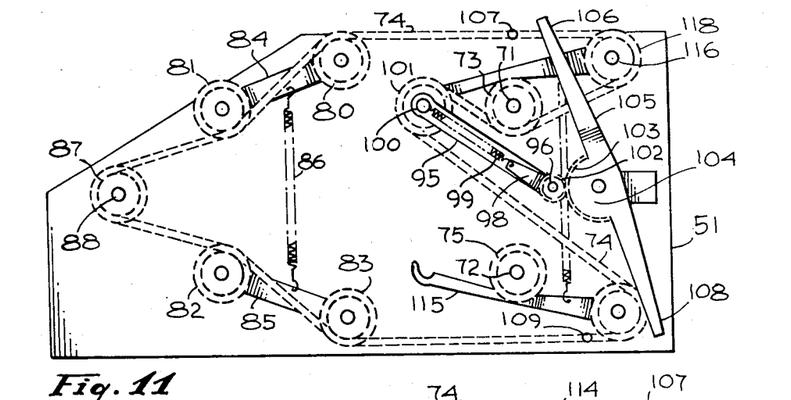
FIG. 11 is a side-elevational view showing the sprockets and roller chain in the upper position for slow piston movement.
Figure 11A:
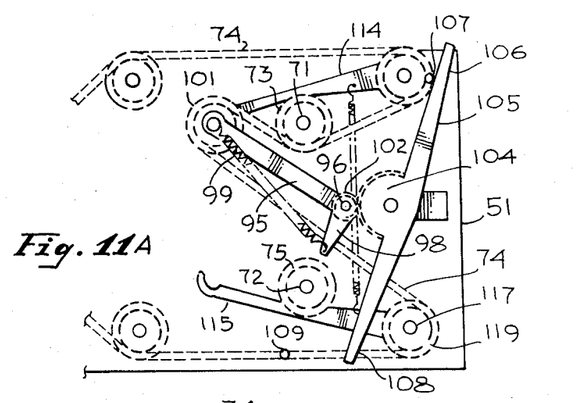
FIG. 11A is a fragmentary view showing the sprockets, roller chain and lever in the upper position, about to be tripped to the lower position.
Figure 12:
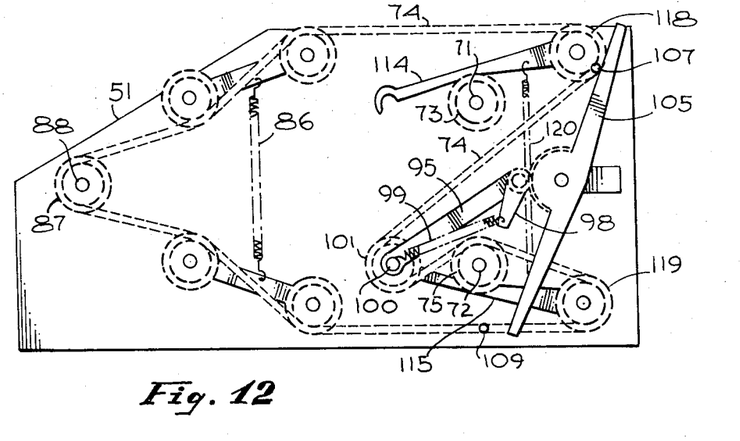
FIG. 12 is a side elevational view showing the sprockets and roller chain in the lower position for fast piston movement.

The reversing means for the driving mechanism for the pistons consists of a shifting arm 95 which is mounted on the pivot 96, disposed on the frame member 51 between the fast drive sprocket 75 and the slow drive sprocket 73. A short biasing lever arm 98, independently rotatable on pivot 96, is connected by a tension spring 99 to the pivot 100 on the free end of the sprocket arm 95, which pivot 100 also rotatably holds the shift sprocket 101. The biasing lever arm 98 is provided with a half-gear 102 which engages corresponding half-gear 103 on the hub 104 of an actuating lever 105 whose upper end 106 is positioned to at times be engaged by a laterally extending pin 107 on the upper run of the main drive chain 74; and whose lower end 108 is positioned to at times be engaged by a pin 109 extending laterally from the lower run of the drive chain 74.

The free end of the biasing lever 98, when moved to one side (downward) by the actuating lever 105, extends the tension spring 99 and causes the arm 95 to shift from its upper position (shown in FIG. 11A) to the lower position (shown in FIG. 12) when released by the restraining arm 114; this also moves the main drive chain 74 out of engagement with slow speed sprocket 73 to engagement with high speed sprocket 75. Since the low speed sprocket 73 is turning in clockwise direction, and the high speed sprocket 75 is turning in counter-clockwise direction, the direction of the drive chain 74 is also reversed.

Restraining arms 114 and 115 are rotatably attached to the pivot shafts 116 and 117 on which are mounted end idler sprockets 118 and 119 respectively, the main drive chain 74 being engaged by these sprockets. A tension spring 120 is provided between the arms. The restraining arms are shaped at their outer ends to engage the sprocket arm 95 in its upper or lower position. These restraining arms are the means for timing the shift from forward motion to reverse or vice versa. They are essentially triggers which are activated by pins 121 or 122 on the inside face of chain 74.

The sample acceptor assembly 22, shown particularly in FIGS. 3, 3A, 3B, 4 and 5, consists of a carriage holder 37 which is disposed horizontally at right angles to the sample chamber 31, with a slot 36 opening at the top to receive the capillary sample tube 20 with the handle means 21 attached thereto, this being so arranged that one end of the capillary sample tube is aligned to enter a tubular opening 38 near the bottom of the sample chamber 31, and the other end of said capillary sample tube 20 being aligned with a tubular opening 39 in a carriage 35, which may slide horizontally in a cavity 34 in the carriage holder, to connect, position, and disconnect the sample tube.

Figures 2, 3, 3A, 3B, 4, 5, 5A:
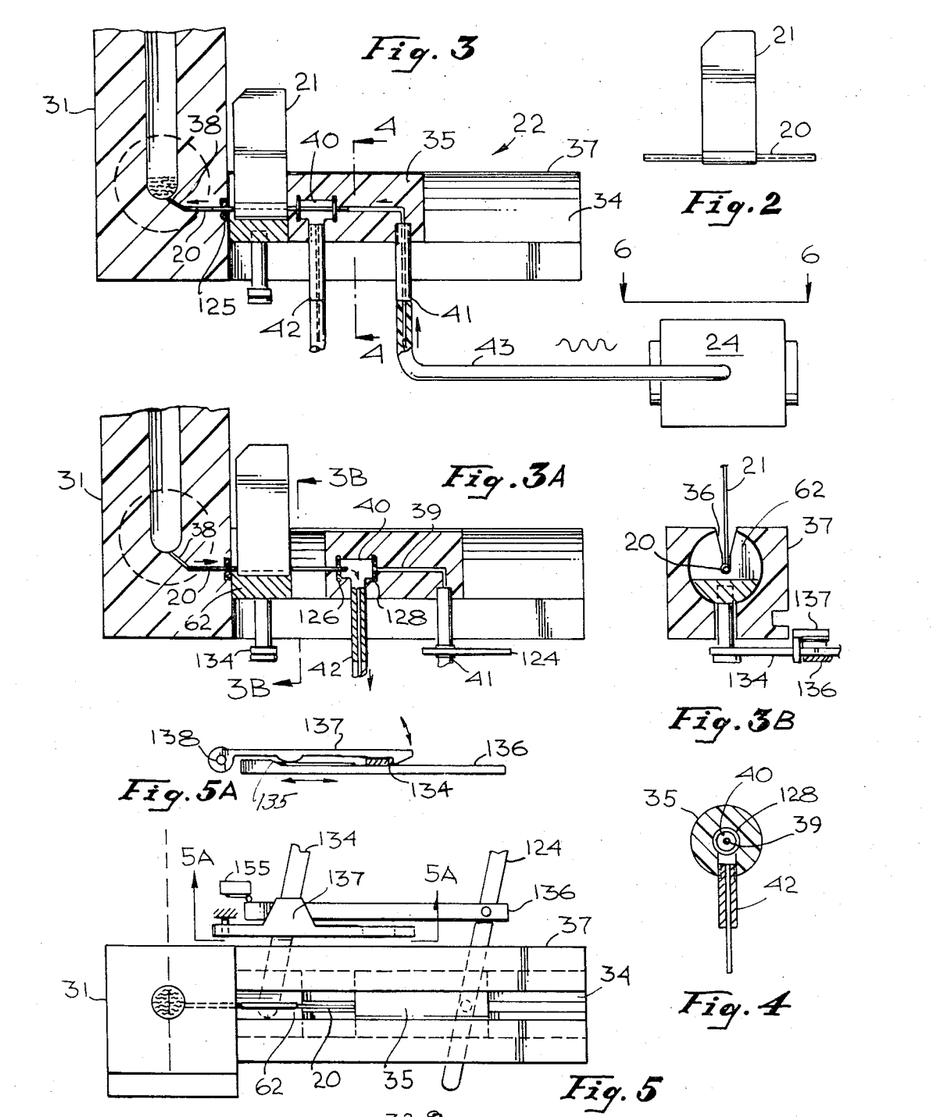
FIG. 2 is a side elevational view of the blood sample holder.
FIG. 3 is a side elevational view partly in section, showing the sample acceptor means, for delivering the blood sample from the holder into the reaction chamber.
FIG. 3A is a side elevational view partly in section showing the discharging of the sample and reagent liquid through the sample tube after the analysis has been completed.
FIG. 3B is a cross-sectional view of the sample holder in place in the acceptor in the discharge cycle position of FIG. 3A.
FIG. 4 is a cross-sectioned view of sample tube holder taken on the line 4—4 of FIG. 3.
FIG. 5 is a diagrammatic plan view of the reaction chamber with sample tube injector and retractor means.
FIG. 5A is a fragmentary elevational view showing the latch means for the arm 134.

The carriage 35 is provided with the horizontal tubular opening 39 which extends from the end adjacent the sample tube but terminates near but not through the opposite end, where it communicates with a downwardly directed nipple 41 extending through a slot below the carriage holder 37, the nipple being connected to the outlet tube 43 from the pulsator 24 and the main pump 25. Intermediate the ends of the horizontal tubular opening 39 in the carriage, there is provided an enlargement or cavity 40 which communicates with a drain nipple 42 extending through a slot downwardly below the carriage holder 37, and being connected to a flexible tube 44A to waste unit 44 which is connected to a vacuum source 45.

The sample accepting mechanism performs several important operations in the analytical cycle of the instrument. It allows a blood sample collected in a calibrated capillary tube to be quantitatively transferred into the photometer chamber for analysis; it provides an automatic means for draining waste solutions after analysis; and it automatically retracts the used capillary tube in readiness for a subsequent sample.

Briefly, these operations may be described as follows, referring to FIGS. 1, 2, 3, 3A, 3B, 4 and 5. Carriage arms 124 and 134 are pivoted at their distal ends to the instrument body and at their proximal ends to drain carriage 35 and sample carriage 62 respectively. Motion of arms 124 and 134 about their distal pivots causes carriages 35 and 62 to slide horizontally in cavity 34. The motion of these two carriages is at times synchronous and at times independent as will be described. When arms 124 and 134 are both disposed to the right, carriages 35 and 62 are positioned separate from each other and from cuvette 31. In this position, a specimen contained in a capillary tube 20 may be inserted in sample carriage 62. Manual motion of arm 124 from right to left causes O-ring 126 in carriage 35 to contact the right hand end of capillary 20. Continued motion leftward of arm 124 causes leftward motion of carriage 62 until the left hand end of capillary 20 contacts O-ring 125 in cuvette 31. Additional manual movement of arm 124 causes the left hand end of capillary 20 to pass into O-ring 125 in cuvette 31 and the right hand end of capillary 20 to pass into and through O-ring 126 in carriage 35. This right hand end continues on through chamber 40 of carriage 35 and finally seats in O-ring 128 of carriage 35. Thus, capillary 20 containing the blood specimen has been effectively sealed into the reagent delivery system of the instrument.

Cross member 136 is operatively connected to carriage arm 124 and passes slidingly beneath carriage arm 134. At the left hand end of cross member 136 is a cam surface 135 which serves two purposes as will be explained. Pivoted above cross member 136 in the vertical plane is a catch arm 137 so disposed that when sample carriage arm 134 is in the extreme left hand position catch arm 137 will lock over arm 134. This effectively locks sample capillary tube 20 into cuvette 31.

After the analysis has been completed, master control unit 148 starts sample retraction motor 132 which rotates cam 133 which in turn moves carriage arm 124 from left to right. Motion of arm 124 slides drain carriage 35 to the right. Since capillary tube 20 is locked to cuvette 31 by catch 137, motion of carriage 35 pulls the right hand end of capillary tube 20 out of O-ring 128 and disposes it in chamber 40. A slight vacuum applied to drainage nipple 42 causes waste solution to leave cuvette 31 via capillary tube 20, chamber 40, and nipple 42.

When time has been allowed for waste drainage, further left to right motion of arm 124 by cam 133 causes carriage 35 to move away from capillary tube 20 pulling it through and out of O-ring 126.

The left to right motion of arm 124 causes cross member 136 to slide under sample carriage arm 134 and to move cam surface 135 under catch arm 137. Cam surface 135 lifts catch arm 137 which frees carriage arm 134. The vertical face of cam surface 135 contacts the side of arm 134 and continued left to right motion causes carriage 62 to extract the left hand end of capillary tube 20 from O-ring 125 in cuvette 31.

One revolution of retraction motor 132 and cam 133 moves both arms 124 and 134 with their respective carriages 35 and 62 to the right hand limit and the motor turns off. The used capillary tube 20 may be lifted out and the instrument is ready to accept a new sample.

At the beginning of an analysis, the reagent from the metering pump 25 passes through the polyvinyl tube 43, which passes through the pulsator 24 and into the inlet nipple 41, and thence through the tubular opening 39 in the carriage, through the capillary sample tube 20, which is sealed into the opening 39 by O-rings 126 and 128, and into the cuvette 31 by way of the tubular opening 38.

Figure 6:
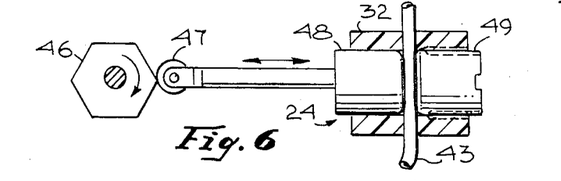
FIG. 6 is a side elevational view of the pulsating mixer means taken from the position 6—6 of FIG. 3.

The pulsator 24 shown particularly in FIG. 6 consists of a casing 32 adjacent a rotatable hexagonal cam 46 which is operatively connected to a motor means 33, a cam follower 47 adjacent thereto being attached to a reciprocable plug 48 in the casing of the pulsator. A fixed block 49 is also provided, and between the reciprocable plug 48 and the fixed block 49 is passed the flexible polyvinyl tube 43 which delivers diluting reagent from the metering pump outlet port 57 to the inlet nipple 41 of the carriage 35.

This pulsator means functions to produce a pulsing in the stream of diluting liquid which carries through to the blood sample in the cuvette 31 while the reagent liquid is flowing thereto, and causes continuous thorough mixing of the sample with the aqueous reagent so that the photometer will give accurate information at all stages of the dilution of the blood sample.

Read-out control knob 157 (FIG. 13) is primarily a means for cancelling the display of results obtained from a previous analysis so that a new cycle may be initiated. However, this function is necessarily only a portion of the total read-out process as will be explained.

Figure 13:
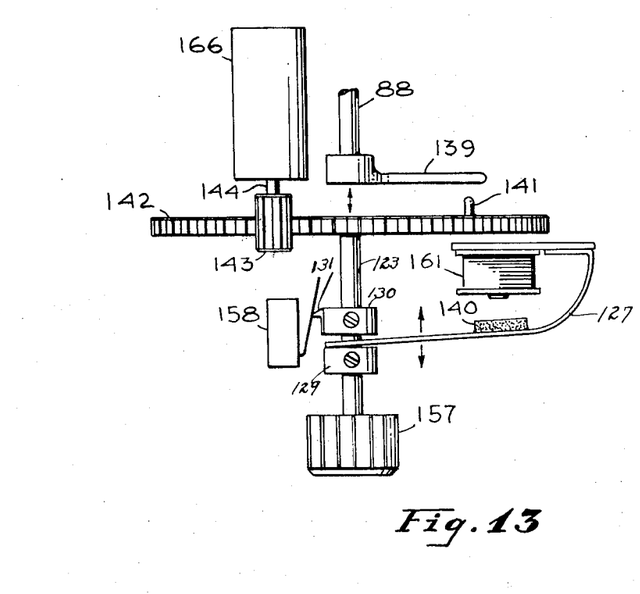
FIG. 13 is a fragmentary plan view showing the mechanism associated with the main starting control knob.

Knob 157 is fixed to the proximal end of shaft 123 and gear 142 is fixed to the distal end. Intermediate to 157 and 142 are two collars 129 and 130 and restrained by them is a spring arm 127 which has armature 140 fixed to it. Shaft 123 is movable both slidingly and rotationally.

Gear 142 is meshed with potentiometer spur gear 143 which has a face wide enough so that gear 142 may slide with shaft 123 and still turn spur 143. Spur gear 143 is fixed to the shaft 144 of potentiometer 166. Thus, rotation of knob 157 turns potentiometer 166 through gears 142 and 143.

The center line of shaft 123 is coincident with that of shaft 88 which drives the pump pistons. On the end of shaft 88 adjacent to gear 142 is fixed an arm 139. On the face of gear 142 adjacent to arm 139 is a pin 141 which projects in such a manner that it can either engage or not engage with arm 139 depending upon the lateral position of shaft 123. Thus, when knob 157 is pushed in, pin 141 can engage arm 139 and motion of the pump pistons can be related to potentiometer position through shaft 88, arm 139, pin 141, gear 142, and spur 143. Conversely, when knob 157 is out, there is no further automatic motion of potentiometer 166 and only manual control is possible.

The tooth-like projection 131 on collar 130 is so disposed that knob 157 must have been turned counterclockwise to the limit of potentiometer 166 before said tooth is in position to operate microswitch 158. When tooth 131 is in said position, galvanometer will read zero. At this time, pushing in on knob 157 will cause tooth 131 to activate microswitch 158 which will, in series with other circuits (see FIG. 14) energize holding solenoid 161. As long as solenoid 161 is energized, armature 140 is held in against the spring tension of arm 127, and pin 141 is disposed to move with and reflect the position of shaft 88.

Figure 14:
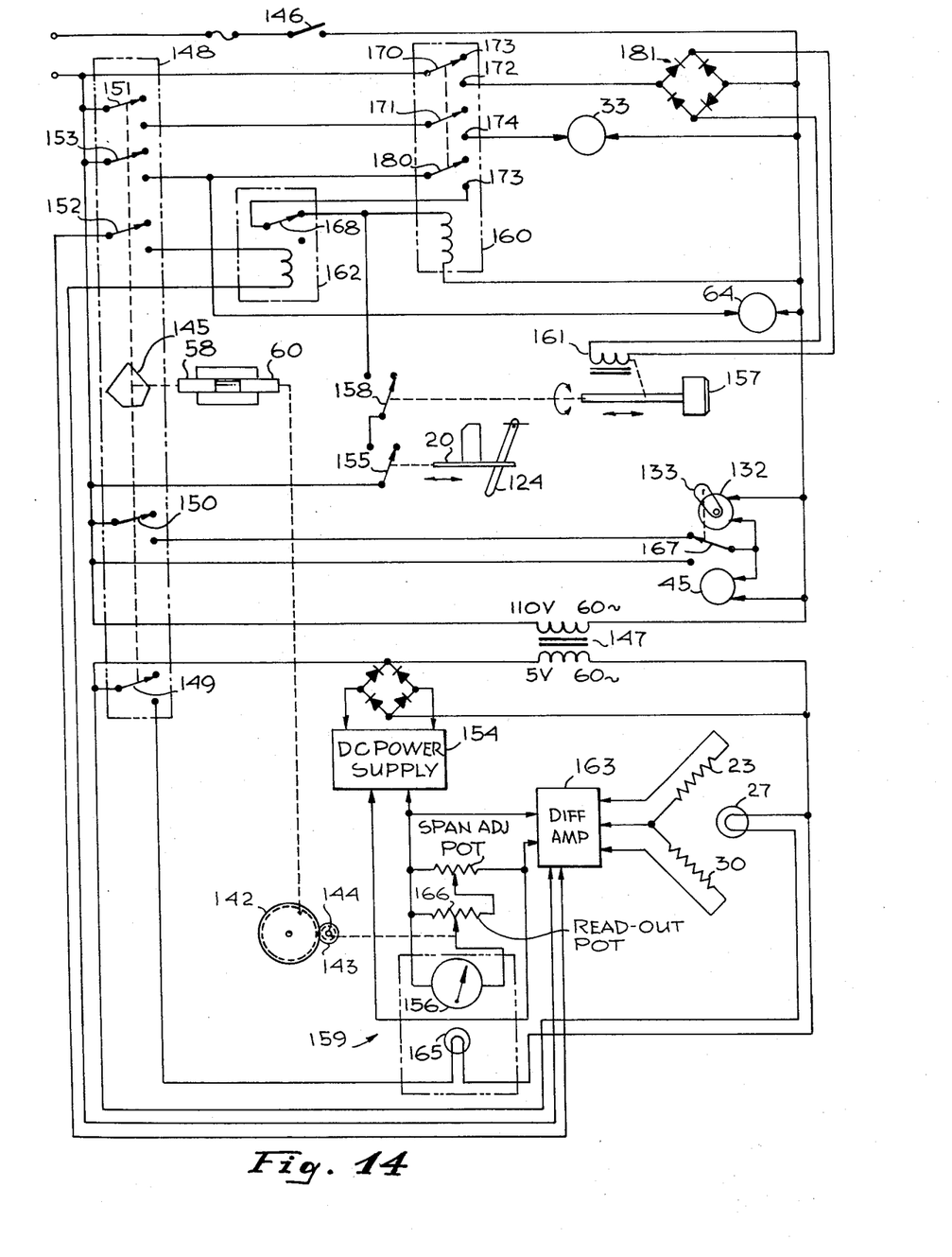
FIG. 14 is the main wiring diagram for the instrument.

At such time as piston motion has caused sufficient fluid to be delivered to cuvette 31 so that an end-point is reached, the differential amplifier 163 will cause relays 160 and 162 to react which will de-energize holding solenoid 161. The spring tension of arm 127 will then move shaft 123 outward and disengage pin 141 from arm 139. The rotational position of potentiometer 166 will reflect the rotational position of shaft 88 and hence the volume of diluting fluid delivered to achieve the end point. Thus, the rotational position of potentiometer 166 is a measure of the hemoglobin content of the blood sample and the proportional electrical signal is displayed on the galvanometer which may be calibrated in appropriate hemoglobin units.

AUTOMATIC FUNCTIONING OF THE INSTRUMENT

Automatic functioning of the instrument is closely related to the mechanical design of the metering pump and its drive unit, which is capable of continuous cycling without electrical control other than the starting switch 146. Forward motion, change of direction and rate, motion limits, and valving are all mechanically controlled. This primary sequence of mechanical events is used to control electrically such auxiliary functions in the instrument as are required to complete a cycle of automatic analysis.

Briefly, motion of the pump pistons actuates a master switch control unit 148, causing the linear displacement of a flat cam surface 145 having five adjustable lobes which operate five snap-action micro-switches (149 to 153) at appropriate times during the pump cycle. These switches totally or partially control certain auxiliary functions as described below.

In detail, a cycle of operation involves the following manual and automatic steps:

(A) Turning on the main switch 146 activates the step down transformer 147 which supplies power to the photometer lamp 27, and the direct current power supply 154 for the photometric and readout circuit (FIG. 14). It also makes power available for all other circuits as required.

(B) Inserting the capillary sample tube 20 and locking it into place by moving lever 124 (manually) activates the normally open cuvette microswitch 155.

(C) Zeroing the galvanometer 156 by depressing and turning the control knob 157 (manually) actuates the normally open microswitch 158.

(D) When the cuvette microswitch 155 and the readout switch 158, which are in series, have been turned on, power is supplied to the coil of a triple pole double throw relay 160.

(E) Closure of the relay 160 energizes the holding solenoid 161 of the readout assembly 159; and also energizes the pump drive motor 64 through the normally closed contact points 168 of a sensitive 5000 ohm relay 162 the coil of which is controlled by the photometric circuit amplifier 163 (see FIG. 14).

(F) Actuation of the pump motor 64 moves the pump pistons 58 and 60, which moves the flat cam surface 145 relative to mounted microswitch 153, and activates said switch, which gives an alternate path for current to the pump drive motor 64; and also rotates the shaft 123 of the readout assembly 159, thus causing readout microswitch 158 to return to normally open position, and power to pump motor 64 then moves along alternate path through microswitch 153, independent of the relay switch 160 and the 5000 ohm relay 162.

(G) Continued pump movement (a) activates microswitch 151 which starts the pulsator motor 33 through the relay 160; (b) activates microswitch 152 which connects the output of photometer amplifier 163 to the sensitive relay 162; (c) continues to rotate potentiometer to reflect the discharge piston 58 position.

(H) Upon reaching the photometer balance point, the amplifier 163 operates the sensitive relay 162 through microswitch 152; when the sensitive 5000 ohm relay 162 opens, the relay 160 unlocks and releases the readout holding coil 161, and this unlocking also stops the pulse pump motor 33. Releasing the readout holding coil 161 disengages the readout potentiometer from control by the piston movement, so that the voltage available from the potentiometer 166 is a function of the linear displacement of the discharge piston 58 at the time the end point was reached. This voltage is applied to galvanometer 156 at this time but cannot be read because galvanometer lamp 165 is not lighted. The pump continues to operate through microswitch 153.

(I) As the pump continues to move near the end of the discharge stroke of piston 58, the microswitch 150 is closed which energizes the sample retraction circuit (see FIG. 14). At the time of complete delivery of liquid, the pump mechanism reverses the direction of movement of the pistons.

(J) Activation of microswitch 150 starts the vacuum pump 45 and the sample retraction motor 132 which rotates the cam 133 which operates microswitch 167 which provides an alternate path for power to the motor 132 and the vacuum pump 45, thus locking both "on" for one revolution of the cam 133. The motion of the cam 133 also moves the sample capillary holding means to cause complete drainage of the cuvette 31 through the capillary tube, and then the final retraction of the sample capillary tube. The alternate power path is destroyed when one revolution of the cam 133 opens microswitch 167. During the drainage of the cuvette and sample tube, the pump drive unit has reversed and opened microswitch 150, so that power is no longer applied to the retraction motor 132 or to the vacuum pump 45.

(K) Continued pump motion in reverse direction activates microswitch 149 which turns on the galvanometer lamp 165. Return of the pistons to initial position opens microswitch 153, and leaves the instrument in stand-by state ready for the next sample.

The instrument control circuit is shown in FIG. 14. It functions as follows:

(1) Inserting sample capillary 20 and manually closing sample acceptor lever 124 actuates the cuvette microswitch 155 from normally open to closed position.

(2) Manual turning of the readout control knob 157 returns the galvanometer 156 to zero and depressing the control knob 157 actuates the readout microswitch 158 from normally open to closed position.

(3) Current flows through above switches 155 and 158, in series, and thence through the triple pole double throw (TPDT) relay 160 which causes relay to close.

(4) When the relay 160 closes, contact 180 is held to contact 173. Contact 173 is in parallel with the coil of relay 160 which is being energized through cuvette microswitch 155 and readout microswitch 158. Current also flows from these switches through a parallel path through the normally closed contacts 168 of the 5000 ohm relay 162, through contacts 173 and 180 of relay 160 to normally open contact of microswitch 153 and thence to drive motor 64. This path starts the instrument cycle.

(5) Closing the TPDT relay 160 activates the rectifier bridge 181 (through contacts 170 and 172) which supplies the readout holding solenoid 161. This couples the readout assembly 159 to piston motion.

(6) Microswitches 153 and 151 are a part of a group of five switches mounted for activation by piston motion. The readout microswitch 158 is activated initially by manual cancellation of the previous reading; return to normal state is effected by piston motion when fluid delivery starts.

(7) Hence, when instrument has started a cycle, the TPDT relay 160 is initially locked down by the readout microswitch 158 (held by holding solenoid 161). As piston motion takes place, microswitch 153 is switched on which provides an alternate source of current to the coil of the TPDT relay 160. Thus, when fluid delivery starts, readout microswitch 158 turns off, but TPDT relay 160 remains locked through microswitch 153.

(8) At an approprite time, piston motion switches microswitch 151 which activates the pulsator motor 33 for stirring through contacts 171 and 174 of TPDT relay 160.

(9) When the photometer signal reaches a predetermined level, output from the differential amplifier 163 rises sharply to close the sensitive 5000 ohm relay 162. Closing this relay opens the circuit through TPDT relay switch contact points 180 and 173, which causes TPDT relay 160 to unlock. Unlocking also opens contacts 170 and 172, thus inactivating rectifier bridge 181 and thus the readout holding coil 161. This disengages the readout mechanism from any further piston motion. Unlocking also stops pulsator motor 33.

(10) At this time the analytical function has been completed—

Sample has been introduced.
Sample has been rinsed from capillary into cuvette.
Sample has been stirred and progressively diluted.
Photometer has responded to pre-set end point.
Readout potentiometer has been responding to piston motion.

Completion of total cycle requires—

Activation of galvanometer lamp for readout.
Emptying of cuvette and retraction of capillary.
Completion of pump cycle.

(11) The remaining steps to complete the total cycle are dependent upon continued pump motion after the end point. Pump motor 64 remains active by virtue of microswitch 153 being in the "on" position. Continued pump motion activates microswitch 149 to turn on galvanometer lamp 165 and microswitch 150 to activate the sample discharge and retraction circuit. Mechanical reversal of pump restores piston to starting position and opens switch 153 for system shut off.

I claim:
1. An instrument for measuring the hemoglobin content of blood comprising in combination,
means for producing directed light beams of equal intensity and wave lengths;
a comparison photocell means for receiving one beam of light after said beam has passed through a standard light-absorbing unit;
an examination chamber having on one side a window for receiving a diplicate light beam and on the opposite side a second photocell means to receive said duplicate light beam after it has passed through the contents of said examination chamber;
means for delivering a known amount of a blood sample to said photometer examination chamber;
reagent delivery means for delivering a metered stream of a reagent liquid into said examination chamber;
electrical means for comparing the electrical impulses from said two photocells; and
metering means associated with said electrical comparison means and said reagent delivery means for measuring the amount of delivered reagent liquid to said chamber containing said blood sample at the time that the optical absorption property of said diluted blood sample is equal to the optical absorption property of said standard light absorbing unit.

2. The instrument defined in claim 1, in which the known amount of a blood sample delivered to said examination chamber is contained in a short length of capillary tubing, said capillary tubing being interposed between said chamber and said reagent delivery means.

3. The instrument defined in claim 2 in which said delivery tube from said reagent delivery means is passed through a pulsator whereby the delivery of reagent liquid is in a succession of pulses whereby to continuously mix the blood sample and reagent liquid while being delivered into said examination chamber.

4. The instrument defined in claim 1, in which the reagent delivery means comprises a cylinder; a pair of pistons movable in said cylinder; a piston rod on each of said pistons extending axially outside each end of said cylinder; inlet and outlet ports disposed radially in the wall of said cylinder at opposite ends thereof, said ports at times being open or closed relative to said space in said cylinder between said pistons, whereby a liquid may be drawn into said cylindrical space between said pistons through said inlet port, and may be forced out of the space between said pistons through said outlet port; and means for sequentially moving said pistons in said cylinder whereby to draw in liquid through said inlet port and subsequently to expel the liquid through said outlet port.

5. The instrument defined in claim 1, in which the reagent delivery means comprises a cylinder; a pair of pistons movable in said cylinder; a piston rod on each of said pistons extending axially outside each end of said cylinder; inlet and outlet ports disposed radially in the wall of said cylinder at opposite ends thereof, said ports at times being open or closed relative to said space in said cylinder between said pistons, whereby a liquid may be drawn into said cylindrical space between said pistons through said inlet port, and may be forced out of the space between said pistons through said outlet port; a motor; a slow speed worm gear and a high speed worm gear being operatively connected to said motor; high speed drive sprocket means and low speed drive sprocket means disposed adjacent said main drive chain and turning in opposite directions; and means for shifting a portion of said main drive chain alternately into operating relation with either the said high speed drive sprocket means or with the said low speed drive sprocket means, whereby to move the said pistons slowly during the fill-discharge cycle of said pump, and to move said pistons more rapidly during the return cycle of said pump.

References Cited
UNITED STATES PATENTS 3,296,922  1/1967  Goldberg __________ 356—40
3,566,133  3/1968  Dorman, Jr. ________ 356—40

MORRIS O. WOLK, Primary Examiner

R. E. SERWIN, Assistant Examiner

U.S. Cl. X.R.
23—230 B; 250—218; 356—40